(12) United States Patent
Wheland et al.

(10) Patent No.: US 6,423,798 B2
(45) Date of Patent: Jul. 23, 2002

(54) COPOLYMERS OF MALEIC ANHYDRIDE OR ACID AND FLUORINATED OLEFFINS

(75) Inventors: Robert Clayton Wheland, Wilmington, DE (US); Paul Douglas Brothers, Chadds Ford, PA (US); Colin Anolick, Wilmington; Charles W. Stewart, Sr., Newark, both of DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/783,498

(22) Filed: Feb. 14, 2001

Related U.S. Application Data

(62) Division of application No. 09/441,927, filed on Nov. 18, 1999, now Pat. No. 6,228,963, which is a division of application No. 09/172,365, filed on Oct. 14, 1998, now Pat. No. 6,107,423.
(60) Provisional application No. 60/091,111, filed on Jun. 29, 1998, and provisional application No. 60/062,338, filed on Oct. 15, 1997.

(51) Int. Cl.⁷ .............................................. C08F 222/02
(52) U.S. Cl. ...................... 526/206; 526/213; 526/247; 526/249; 526/250; 526/251; 526/252; 526/253
(58) Field of Search ................................ 526/206, 213, 526/247, 249, 250, 253, 254, 255

(56) References Cited

U.S. PATENT DOCUMENTS

| 2,951,064 A | 8/1960 | Lo |
|---|---|---|
| 2,965,595 A | 12/1960 | Brinker et al. |
| 2,988,542 A | 6/1961 | Bro et al. |
| 3,632,847 A | 1/1972 | Hartwimmer |
| 3,839,305 A | 10/1974 | Moore |
| 4,186,121 A | 1/1980 | Gangal |
| 4,506,035 A | 3/1985 | Barnett et al. |
| 4,524,197 A | 6/1985 | Khan |
| 4,732,941 A | 3/1988 | Numa |
| 5,173,555 A | 12/1992 | Kappler et al. |
| 5,231,154 A | 7/1993 | Hung |
| 5,231,155 A | 7/1993 | Kappler et al. |
| 5,276,121 A | 1/1994 | Resnick |
| 5,576,106 A | 11/1996 | Kerbow et al. |
| 5,712,348 A | 1/1998 | Pechhdd |

FOREIGN PATENT DOCUMENTS

| AU | 550961 | 4/1986 |
|---|---|---|
| DE | 4210594 | 6/1993 |
| EP | 650987 | 5/1995 |
| EP | 761757 | 3/1997 |
| JP | 61-205 | 1/1986 |

OTHER PUBLICATIONS

M. Miller et al., J. Appl. Polym. Sci., 14, 257–266, 1970.

*Primary Examiner*—Bernard Lipman

(57) ABSTRACT

Novel copolymers of fluorinated olefins and maleic anhydride, maleic acid, dichloromaleic anhydride or dichloromaleic acid may be made by using as solvents for the maleic anhydride or acid a perfluorinated alkyl carboxylic acid, or liquid or supercritical hexafluoropropylene or carbon dioxide. The resulting polymers are useful as adhesives or compatibilizing agents for fluoropolymers, and in coatings.

9 Claims, No Drawings

COPOLYMERS OF MALEIC ANHYDRIDE OR ACID AND FLUORINATED OLEFFINS

This application is a divisional application of Ser. No. 09/441,927, filed Nov. 18, 1999, now U.S. Pat. No. 6,228,963, which is a divisional application of Ser. No. 09/172,365, filed on Oct. 14, 1998, now U,S. Pat. No. 6,107,423, which claims priority from provisional applications 60/091,111, filed on Jun. 29, 1998 and 60/062,338, filed on Oct. 15, 1997.

FIELD OF THE INVENTION

Novel copolymers of maleic anhydride, maleic acid, dichloromaleic anhydride or dichloromaleic acid and fluorinated olefins are prepared by free radical polymerization in a nonaqueous medium in the presence of a solvent such as a perfluorinated alkyl carboxylic acid, or liquid or supercritical carbon dioxide or hexafluoropropylene.

TECHNICAL BACKGROUND

Fluorinated polymers are important items of commerce, being particularly noted, for instance, for their thermal and chemical resistance, and their often unusual surface properties. However, sometimes these unusual properties, as for example low adhesion to substrates, are often themselves also problems in the use of these polymers, so fluorinated (co)polymers with modified properties are constantly being sought.

Although it is known that certain functional groups, especially polar functional groups, can modify the properties of fluoropolymers, incorporation of these groups into fluoropolymers without sacrificing other desirable properties is often difficult for a variety of reasons. For example the required monomers may not copolymerize with fluorinated monomers or may cause other undesirable effects in a copolymerization, or incorporation of a monomer containing a polar group may adversely affect the chemical and/or thermal stability of the resulting polymer. While it is known that maleic anhydride or maleic acid are desirable comonomers for such polymerizations, practical methods for the incorporation of these monomers into fluoropolymers have been lacking, and therefore preparation and use of such polymers has languished.

Polymers containing relatively high proportions of fluorinated olefins, especially highly fluorinated olefins, have generally been grafted with MAN (or MAN copolymers) rather than being formed by copolymerizing with the MAN, see for instance M. Miller, et al., J. Appl. Polym. Sci., vol. 14, p. 257–266 (1970), German Patent Application 4,210,594, U.S. Pat. Nos. 5,576,106, 4,506,035, Australian Patent 550,961, and European Patent Applications 761,757 and 650,987. Many of these references also describe uses for such grafted polymers which are also applicable to the polymers herein.

SUMMARY OF THE INVENTION

This invention concerns a first polymer, comprising, repeat units derived from:
(a) at least 1 mole percent hexafluoropropylene;
(b) at least 1 mole percent total of one or more of tetrafluoroethylene, vinyl fluoride, trifluoroethylene, chlorotrifluoroethylene, ethylene, and vinylidene fluoride; and
(c) 0.03 to about 5 mole percent total of one or more of maleic anhydride, maleic acid, dichloromaleic anhydride or dichloromaleic acid.

This invention also concerns a second polymer, comprising, repeat units derived from:
(a) at least 1 mole percent tetrafluoroethylene or chlorotrifluoroethylene;
(b) at least one mole percent of ethylene, a compound of the formula $F_2C=CFOR^1$ wherein $R^1$ is alkyl or halogen substituted alkyl containing 1 to 10 carbon atoms and optionally containing one or more ether oxygen atoms between perfluoroalkylene or perfluoroalkyl segments, perfluoro(2-methylene-4-methyl-1,3-dioxolane), $F_2C=CF(CF_2)_pOCF=CF_2$ wherein p is 1 or 2, or a compound of the formula

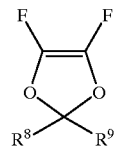

(I)

wherein $R^8$ and $R^9$ are each independently fluorine or perfluoroalkyl containing 1 to 4 carbon atoms; and
(c) 0.03 to about 10 mole percent of one or more of maleic anhydride, maleic acid, dichloromaleic anhydride or dichloromaleic acid.

This invention also concerns a third polymer, comprising, repeat units derived from:
(a) at least 1 mole percent vinyl fluoride, vinylidene fluoride, or chlorotrifluoroethylene; and
(b) 0.03 to about 10 mole percent of one or more of maleic anhydride, maleic acid, dichloromaleic anhydride or dichloromaleic acid.

Also disclosed herein is a process for the production of maleic anhydride, maleic acid, dichloromaleic anhydride or dichloromaleic acid copolymers with fluoroolefins by free radical polymerization in an essentially nonaqueous polymerization system, wherein the improvement comprises, using as a solvent one or more of: a compound of the formula $R^6CO_2H$ wherein $R^6$ is perfluoroalkyl containing 1 to 6 carbon atoms, liquid or supercritical carbon dioxide, or liquid or supercritical hexafluoropropylene.

Further disclosed is a coated substrate coated with the compositions disclosed herein, a composite structure comprising the coated substrate plus an additional substrate adhered to the coated substrate and a melt blend of thermoplastic with the compositions disclosed herein.

DETAILS OF THE INVENTION

The process described herein for incorporating maleic acid (MAC), maleic anhydride (MAN), dichloromaleic anhydride (DCMAN) or dichloromaleic acid (DCMAC) (or collectively MA) in polymers derived from fluorinated olefins is similar to prior art processes for free radically polymerizing such fluorinated olefins in nonaqueous systems. Preferred monomers of MA are MAC and MAN.

By a fluorinated olefin is meant a compound in which at least one of the vinylic hydrogen atoms is replaced by a fluorine atom. Thus useful fluorinated olefins include tetrafluoroethylene (TFE), chlorotrifluoroethylene (CTFE), hexafluoropropylene (HFP), vinylidene fluoride (VF2), vinyl fluoride (VF), trifluorovinyl methyl ether, perfluoro (methyl vinyl ether) (PMVE), perfluoro(ethyl vinyl ether) (PEVE), and perfluoro(propyl vinyl ether) (PPVE), but does not include olefins such as 3,3,3-trifluoropropene and vinyl trifluoromethyl ether.

Herein, fumaric acid may be substituted, in the same required and preferred proportions, in any composition or process in which MAC is used.

By "repeat units derived from" herein is meant that the repeat units specified (and the monomers they are derived from) were incorporated into the fluoropolymer by addition polymerization, and not, for instance, by grafting. Grafting of compounds such as MAN onto already existing polymers results polymers which have a different structure. Generally the MAN moiety which is grafted onto the fluoropolymer is a side chain on the polymer, not part of the main polymer chain.

The free radically polymerized (co)polymerization of such monomers in nonaqueous systems is known, see for instance U.S. Pat. No. 5,637,663, W. Gerhartz, et al., Ed., Ullmann's Encyclopedia of Industrial Chemistry, Vol. A11, VCH Verlagsgesellschaft mbH, Weinheim, 1988, p. 393–429, and H. Mark, et al., Ed., Encyclopedia of Polymer Science and Engineering, Vol. 16, John Wiley & Sons, New York, 1989, p. 577–648, all of which are hereby included by reference. Conditions in such polymerization systems need not be changed significantly to incorporate MA into the polymer being made, just inclusion of the one (or more) of the solvents listed above and of course one or more of MAN, MAC, DCMAN or DCMAC. By a nonaqueous system is meant that a separate predominantly aqueous phase is not present in significant quantities in the polymerization process, and preferably is not present at all. Since MAC and DCMAC are soluble in water, they do not readily copolymerize with fluorinated monomers when an aqueous phase is present. Also, when water is present MAN or DCMAN is readily converted to MAC or DCMAC, respectively. Conversely, if the polymerization is carried out at higher temperatures, MAC or DCMAC may be dehydrated to MAN or DCMAC, respectively.

By a solvent in this polymerization process is meant a material which dissolves to a significant extent in the same phase the MAN and/or MAC and/or DCMAN and/or DCMAC, the other monomers, and the initiator(s). Production of the desired MA copolymer under these conditions is evidence that these solubility conditions have been met. Of course the solvent should preferably not significantly interfere with the polymerization, such as by causing excessive chain transfer or premature termination of the polymerization. It need not dissolve the product polymer to any significant extent. Thus the nonaqueous polymerization may be a true solution polymerization in which all of the components and the product polymer are soluble in the process medium, or it may be a suspension, slurry or dispersion polymerization in which some or all of the starting materials, and especially the product polymer, are not very soluble in the polymerization medium. It is preferred that $R^6$ is perfluoro-n-alkyl and more preferred that it is trifluoromethyl. At polymerization temperatures >100° C., and when hexafluoropropylene is acceptable as a comonomer [if it copolymerizes with the other monomer(s)], it is preferred that the solvent is supercritical hexafluoropropylene, or a combination of supercritical hexafluoropropylene and trifluoroacetic acid, more preferably about 1 volume percent trifluoroacetic acid.

As mentioned above conventional conditions may be used in the free radical catalyzed preparation of the MA copolymers. For instance, useful initiators include $NF_3$, bis(4-t-butylcyclohexyl)peroxydicarbonate, perfluoropropionyl peroxide, isobutyryl peroxide, and $CF_3CF_2CF_2OCF(CF_3)$ (C=O)OO(C=O)(CF$_3$)CFOCF$_2$CF$_2$CF$_3$. These may be utilized at their "normal" use temperatures. The process may be run in any conventional manner, such as batch, semi-batch or continuously. For polymers with high HFP contents, especially those which are copolymers with TFE and/or VF2 and are amorphous, the procedure described in U.S. Pat. No. 5,637,663 may be used. Here of course the HFP acts not only as a solvent for the MA, but also is one of the monomers that is polymerized. Indeed if HFP is utilized as the solvent, it will often also act as a monomer incorporated into the polymer. The MA may be added as melt to any of the solvents during the process.

Sufficient MA should be added to the polymerization medium to assure the desired amount of MA in the resulting polymer. The amounts needed for any particular polymer incorporation will vary depending on the polymerization conditions and the monomers (and their proportions) being polymerized, but as is generally known, an increase of MA in the polymerization medium will usually result in an increase in the amount of MA incorporated into the polymer. It is preferred that the first polymer contain about 0.1 to about 2 mole percent of MA derived repeat units. It is preferred that the second polymer contain about 0.03 to about 5 mole percent of MA derived repeat units, more preferably about 0.1 to about 2 mole percent of MA derived repeat units.

It is known in the art that many polymers containing MA derived repeat units can be reversibly changed from MAN to MAC units or DCMAN to DCMAC units. The anhydride can be converted to the diacid by exposure to water, although with polymers that are highly water repellent this may take some time. Conversely, the diacid may be converted to the anhydride by heating especially in the absence of water. Either the anhydride or diacid may be converted to a monobasic or dibasic salt by reaction with appropriate amount of base such as a metallic or ammonium hydroxide. Of course only some of the MAC or DCMAC groups may be converted to the monobasic salt, or some may be in the form of the monobasic salt and some in the form of the dibasic salt. The salts may be converted back to a diacid by reaction with an appropriate amount of acid, the acid preferably being a stronger acid than the carboxyl groups of the polymeric MAC or DCMAC.

During the polymerization process, MA may be added intermittently or only during part of the process or the amount of MA may be varied, so that the amount of MA in the polymer is not necessarily uniform, and in some cases some of the polymer will not contain MA at all. In this way a polymer fraction containing MA which may act as an adhesive (see below) for the bulk polymer is produced.

The first polymer herein must contain repeat units derived from HFP and one or more of TFE, VF2, trifluoroethylene (TF3), ethylene (E) and vinyl fluoride (VF). In such a polymer, it is preferred that the polymer contain at least about 20 mole percent, more preferably at least about 30 mole percent of repeat units derived from HFP. The HFP repeat unit is —CF(CF$_3$)CF$_2$—. It is also preferred that this polymer be amorphous. By amorphous is meant there is no melting transition with the heat of fusion greater than 1 J/g above 35° C., when measured by Differential Scanning Calorimetry. It is also preferred when repeat units derived from TFE or VF2 is present that each be about at least 10 mole percent of the repeat units present. The repeat unit derived from TFE is —CF$_2$CF$_2$—, the repeat unit derived from VF2 is —CF$_2$CH$_2$—, the repeat unit derived from E is —CH$_2$CH$_2$—, the repeat unit derived from TF3 is —CFHCF$_2$—, the repeat unit derived from CTFE is —CF$_2$CFCl—, and the repeat unit derived from VF is —CFHCH$_2$—. In another preferred form, the first polymer additionally comprises one or more other repeat units derived from one or more of 3,3,3-trifluoropropene, 2,3,3,3-tetrafluoropropene, 4-bromo-3,3,4,4-tetrafluoro-1-butene, $CH_2=CHO(C=O)R^2$ wherein $R^2$ is perfluoro-n-alkyl containing 1 to 8 carbon atoms, $CH_2=CHR^3$ wherein $R^3$ is perfluoro-n-alkyl containing 1 to 8 carbon atoms, $CH_2=CH(C=O)OR^4$ wherein $R^4$ is CnFxHy wherein x+y=2n+1 and n is 1 to 8, chlorotrifluoroethylene, $CF_2=CFR^5$ wherein $R^5$ is perfluoroalkyl optionally containing one or more of one or more ether groups, one cyano group, or one sulfonyl fluoride group, perfluoro(2-methylene-4-methyl-1,3-dioxolane), perfluoro(1,3-dioxole), a perfluoro(2,2-alkyl substitued-1,3-dioxole), 4,5-difluoro-2,2-bis(trifluoromethyl)-1,3-dioxole or $FSO_2CF_2CF_2OCF(CF_3)CF_2OCF=CF_2$, $F_2C=CF(CF_2)_p OCF=CF_2$ wherein p is 1 or 2, and $F_2C=CFOR^7$ wherein $R^7$ is alkyl or halogen substituted alkyl containing 1 to 10 carbon atoms, and optionally containing one or more ether oxygen atoms between carbon atoms.

The presence of repeat units in the first polymer derived from one or more of the "other" monomers is preferably no more than about 10 mole percent each, and also preferably no more than about 2 mole percent each, and also more preferably the total amount of other monomers is less than about 15 mole percent.

Preferred first polymers (molar percents): HFP (30–70)/TFE (30–70)/MA (0.1–2); HFP (30–70)/TFE (1–50)VF2 (1–50)/MA (0.1–2); HFP (40–70)/VF2 (30–60)/MA (0.1–2).

The second polymer contains at least 1 mole percent of repeat units derived from TFE, preferably at least about 40 mole percent of such repeat units. It also contains at least one mole percent, preferably at least about 40 mole percent, of repeat units derived from ethylene (—$CH_2CH_2$—), or a preferably at about 1 to about 5 mole percent of a repeat unit derived from a compound of the formula $F_2C=CFOR^1$ wherein the polymer is a thermoplastic, or at least 30 mole percent wherein the polymer is an elastomer. It is preferred that either ethylene or $F_2C=CFOR^1$ (not both) be present in the polymer. In preferred polymers containing $F_2C=CFOR^1$, $R^1$ is alkyl, more preferably n-alkyl, or perfluoroalkyl, more preferably perfluoro-n-alkyl, and especially preferably trifluoromethyl, perfluoroethyl or perfluoropropyl.

Specific preferred second polymers are (mole percents in parentheses): TFE (30–98.95)/perfluoro(alkyl vinyl ether) (1–69)/MA (0.03–10); TFE (30–69)/perfluoro(propyl vinyl ether (1–9)/MA (0.03–5); TFE (30–68.95)/ethylene (30–70)/MA (0.1–10); and TFE (5–50)/4,5-difluoro-2,2-bis (trifluoromethyl)-1,3-dioxolane (40–95)/MA (0.05–5).

Additional repeat units which may be present in the second polymer are one or more of vinyl fluoride, trifluoroethylene, 3,3,3-trifluoropropene, 2,3,3,3-tetrafluoropropene, 4-bromo-3,3,4,4-tetrafluoro-1-butene, $CH_2=CHO(C=O)R^2$ wherein $R^2$ is perfluoro-n-alkyl containing 1 to 8 carbon atoms, $CH_2=CHR^3$ wherein $R^3$ is perfluoro-n-alkyl containing 1 to 8 carbon atoms, $CH_2=CH(C=O)OR^4$ wherein $R^4$ is $C_nF_xH_y$ wherein x+y=2n+1 and n is 1 to 8, chlorotrifluoroethylene, $CF_2=CFR^5$ wherein $R^5$ is perfluoroalkyl optionally containing one or more ether groups, one cyano group, or one sulfonyl group, or $CF_2=CFOCF_2CF(CF_3)OCF_2CF_2SO_2F$.

In the third polymer herein repeat units derived from other monomers may also be present. Preferred comonomers include vinyl fluoride, trifluoroethylene, 3,3,3-trifluoropropene, 2,3,3,3-tetrafluoropropene, 4-bromo-3,3,4,4-tetrafluoro-1-butene, $CH_2=CHO(C=O)R^2$ wherein $R^2$ is perfluoro-n-alkyl containing 1 to 8 carbon atoms, $CH_2=CHR^3$ wherein $R^3$ is perfluoro-n-alkyl containing 1 to 8 carbon atoms, $CH_2=CH(C=O)OR^4$ wherein $R^4$ is $C_nF_xH_y$ wherein x+y=2n+1 and n is 1 to 8, chlorotrifluoroethylene, $CF_2=CFR^5$ wherein $R^5$ is perfluoroalkyl optionally containing one or more ether groups, one cyano group, or one sulfonyl group, $CF_2=CFOCF_2CF(CF_3) OCF_2CF_2SO_2F$, perfluoro(2-methylene-4-methyl-1,3-dioxolane), perfluoro(1,3-dioxole), a perfluoro(2,2-alkyl substitued-1,3-dioxole), 4,5-difluoro-2,2-bis (trifluoromethyl)-1,3-dioxole, or $F_2C=CF(CF_2)_p OCF=CF_2$ wherein p is 1 or 2, and $F_2C=CFOR^7$ wherein $R^7$ is alkyl or halogen substituted alkyl containing 1 to 10 carbon atoms, and optionally containing one or more ether oxygen atoms between carbon atoms.

Specific preferred third polymers are MAC or MAN (0.1–1 0)/VF (90–99.9); MAC or MAN (0.1–10)/VF2 (90–99.9).

In any of the above polymers, when the repeat units are "derived" from maleic acid, they may actually be made from maleic anhydride and hydrolyzed, or if the repeat units are "derived" from maleic anhydride they may actually be made from maleic acid and dehydrated, and similarly for dichloromaleic anhydride and acid.

The polymers containing MA (or their salts) are useful in many applications. They may act as adhesives between two different fluoropolymers, or probably more important, between a fluoropolymer and another substance, such as another polymeric material, for example a thermoplastic. In order to accomplish this, a layer of the MA copolymer may be coated onto the fluoropolymer or other substrate and the fluoropolymer and other substrate surfaces brought together. If another thermoplastic is the substrate, it preferably contains functional groups which may react with anhydride and/or carboxyl groups, thereby forming a stronger adhesive bond. Blends of polymers containing and not containing MA may be made during polymer synthesis, see above. Alternately, the MA copolymer may be (melt) mixed into the fluoropolymer which will then adhere better to another substance, or coextruded as a layer between two other polymer layers to be bonded. A blend of the MA copolymer and another fluoropolymer or other thermoplastic may alter the surface characteristics of the fluoropolymer. For example, the fluoropolymer may be more easily wetted. In such a situation the fluoropolymer may be more easily marked, as by ink, therefore rendering useful as a labeling material. The MA containing polymers may be used in blends as compatibilizing agents between fluoropolymers and other types of polymers. Other uses include polymers for coatings, or polymers that may be crosslinked, especially elastomers.

The use of the MA containing polymers as adhesives, compatibilizing agent and for other uses can be accomplished as is known in the art for other kinds of polymers which accomplish the same end using similar methods. For instance, melt mixing of compatibilizing polymers into polymers or polymers blends using equipment such as screw extruders is well known. Similarly multilayer film extrusion, including the use of so-called adhesive or tie layers is also well known.

In the Examples, all pressures are gauge pressures, unless otherwise noted.

In the Examples, the following abbreviations are used:
DSC—Differential Scanning Calorimetry
FC-40—mostly perfluoro(tributylamine)
FC-75—perfluoro(n-butyltetrahydrofuran)
HFP—hexafluoropropylene HFPOdP—$CF_3CF_2CF_2OCF(CF_3)(C=O)OO(C=O)(CF_3)$
   $CFOCF_2CF_2CF_3$
MAC—maleic acid
MAN—maleic anhydride
Mn—number average molecular weight
Mw—weight average molecular weight
PBT—poly(butylene terephthalate)
PDD—4,5-difluoro-2,2-bis-(trifluoromethyl)-1,3-dioxole
PET—poly(ethylene terephthalate)
PEVE—perfluoro(ethyl vinyl ether)
PMVE—perfluoro(methyl vinyl ether)
PPVE—perfluoro(propyl vinyl ether)
rt—room temperature
Tg—glass transition temperature (taken as the midpoint of the transition)
TGA—thermogravimetric analysis
Tm—melting point (taken as the peak of the melting endotherm)
VF2—vinylidene fluoride In the polymers exemplified below, maleic anhydride concentrations were most often estimated by IR spectroscopy. A solution of 0.1 g succinic anhydride in 10 ml of ethanol in a 0.102 mm $CaF_2$ cell gave absorptivities of 1765 $cm^2$/g at 1867 $cm^{-1}$ and 10,894 $cm^2$/g at 1790 $cm^{-1}$. Assuming that copolymerized maleic anhydride has the same absorptivity as ethanolic succinic anhydride, maleic anhydride concentrations can be estimated. When cold pressed as thin films, the TFE/PPVE/MA terpolymers showed peaks at 1896 and 1819 $cm^{-1}$, the TFE/PDD/MA terpolymers at 1897 and 1822 $cm^{-1}$, and the TFE/E/MA terpolymers at 1857 and 1782 $cm^{-1}$. In the case of TFE/PPVE/MA, an internal IR band at 2363 $cm^{-1}$ was used to measure film thickness while in the case of TFE/PDD/MA and TFE/E/MA film thickness was measured with a micrometer. At the 0.15 mm to 0.25 mm thicknesses achieved with 69 MPa to 180 MPa of pressure on 0.1 to 0.2 g of sample in a 13 mm die, the stronger anhydride band at 1782–1822 $cm^{-1}$ was generally off scale leaving the weaker anhydride band at 1857 to 1897 $cm^{-1}$ to be used for MA concentration calculations. In the case of the TFE/PPVE/MA copolymers, the spectrum of a Teflon® PFA control sample was subtracted prior calculation.

EXAMPLE 1

Monomer Solubilities in Conventional Fluids

Monomers were stirred with potential solvents, gradually increasing the amount of solvent until the monomer either dissolved or impracticably high dilution was approached.

| Monomer Candidate | Approximate Solubility at Room Temperature |
| --- | --- |
| Maleic Anhydride | >50 g/100 ml $CF_3COOH$ |
|  | >40 g/100 ml $CF_3CF_2CF_2COOH$ |
|  | <1 g/1000 ml $CF_2ClCCl_2F$ |
|  | <1 g/1000 ml perfluoro(n-butyl tetrahydrofuran |
|  | <1 g/1000 ml $CF_3CFHCFHCF_2CF_3$ |
|  | <1 g/1000 ml $CF_3CF_2CF_2OCFHCF_3$ |
| Maleic Acid | >10 g/100 ml $CF_3COOH$ |

EXAMPLE 2

Maleic Anhydride Solubility in Hexafluoropropylene

A. Maleic Anhydride in Liquid Hexafluoropropylene. A 3 mL view cell was loaded with 0.0417 g maleic anhydride. Liquid hexafluoropropylene was added to fill and pressurize the cell. Complete solution, an estimated about 1 wt % maleic anhydride in hexafluoropropylene, was observed at 65° C. and >5.5 MPa and also at 69° C. and >2.4 MPa.

B. Maleic Anhydride/Trifluoroacetic Acid in Liquid Hexafluoropropylene. A 3 mL view cell was loaded with 0.050 g maleic anhydride and 0.1298 g trifluoroacetic acid. Liquid hexafluoropropylene was added to fill and pressurize the cell. Complete solution, an estimated 1.1 wt % maleic anhydride and 3.0 wt % trifluoroacetic acid in hexafluoropropylene, appeared to occur at 23° C. and >700 kPa.

EXAMPLE 3

Maleic Anhydride Solubility in Liquid and Supercritical Carbon Dioxide

A 3 mL view cell was loaded with 0.1033 g maleic anhydride. Liquid carbon dioxide was added to fill and pressurize the cell. Except for a bit of a persistent deposit on the cell windows, near complete solution was observed almost instantly after filling the cell with liquid carbon dioxide and stirring. Heating to 73° C. and 25 MPa cleared the window deposits after which solubility could be explored at lower temperatures. Complete solution, for example, was observed at 10.8° C. and 59 MPa and the start of a cloud point at 17.2° and 7.4 MPa.

EXAMPLE 4

Poly(HFP/TFE/MAN)

A. Polymer Preparation: The same set up was used as in Example 1 of U.S. Pat. No. 5,637,663. A mixture of 2000 g HFP, 110 g TFE, 5 g MAN dissolved in 10 ml trifluoroacetic acid, and about 1.1 g of $NF_3$ was made in 1 gallon reservoir (2). About 1120 g of this mixture was run through the 10 ml shaken autoclave at 250° C./96.5 MPa over a 125 min period. After drying the product under vacuum at 150° C., 80 g of yellow polymer were obtained.
1 g/5 ml FC-75 largely dissolves at reflux
Mw=88,600 by GPC in FC-75 at 50° C.
Mn=37,400 by GPC in FC-75 at 50° C.
Melt index 180° C., 5 kg=7 g/min, clear, tan
Tg=28° C. (second heat) by DSC @10° C./min under $N_2$
10% wt. loss temperature 420° C. @10° C./min under $N_2$
Tm, none detected by DSC @10° C./min under $N_2$
0.9 mole % maleic anhydride by $^{13}C$ NMR in hexafluorobenzene at 60° C., absorption @ about 161 ppm
37.7 mole % HFP by $^{13}C$ NMR
61.4 mole % TFE by $^{13}C$ NMR
Productivity 3.8 kg/L/hr (32 lb./gal/hr)

B. Evidence for Improved Adhesion: The terpolymer prepared above was dissolved at 3 wt. % in Fluorinert® FC-40 (3M Corp.) by stirring at room temperature.

Test bars approximately 2.5 cm×15 cm×0.31 cm were obtained of the following materials: stainless steel, aluminum, glass, Crastin® PBT (DuPont), Delrin® polyacetal (DuPont), Hytrel®, Rynite® PET (DuPont) and Zytel® nylon (DuPont). The test bars were cleaned by rinsing in acetone and then drying.

One sample of each test bar was dipped ⅔ of its length in the terpolymer solution. The bar was removed from the solution, was allowed to drain completely and was dried by hanging in an air circulating oven at 150° C. for 30 min. After drying, each bar was removed from the oven, allowed to cool to room temperature and was then dipped ⅓ of its length in a 3 wt % solution of 50:50 HFP:TFE copolymer in Fluorinert® FC-40 (3M Corp.). The bar was removed from the solution, was allowed to drain completely, and was dried by hanging in an air circulating oven at 150° C. for 30 minutes. Each bar was then removed from the oven and allowed to cool to room temperature. This resulted in each bar consisting of 3 sections of approximately equal length. One section of each bar was uncoated, one section was coated only with a thin coating of terpolymer, and one section with a first coat of terpolymer followed by a top coat of 50:50 HFP:TFE copolymer.

Both the terpolymer coating and the terpolymer first coat with 50:50 HFP:TFE copolymer top coat were strongly adhered to all test bars and could not be removed by scraping with a fingernail.

All test bars were then placed in boiling water for one h. They were removed from the water, patted dry and were allowed to cool to room temperature. All bars were then subjected to ASTM D3359 Method B scratch test, in which a crossing grid is scratched into the coating, adhesive tape is applied and removed and the surface examined for flaking of the coating. No flaking was observed for any of the samples for either the terpolymer coating or the terpolymer first coat followed by 50:50 HFP:TFE copolymer top coat. An Eberhard Faber No. 101 eraser was rubbed against the coatings on all samples. Both the terpolymer coating and the terpolymer first coat with 50:50 HFP:TFE copolymer top coat remained intact for all samples except for the Rynite® and Delrin® samples, in which the coatings could be rubbed off.

When the 50:50 HFP:TFE copolymer coating is applied and dried in the above manner to each of the test bars without first applying a terpolymer coat, the coating is easily removed by scraping with a fingernail from all bars except the aluminum test bar which is strongly bonded. This demonstrates that the adhesion of both a solution coated terpolymer film and a terpolymer first coat followed by a 50:50 HFP:TFE copolymer solution coating are significantly better than a 50:50 HFP:TFE polymer single coat on a broad variety of substrates.

EXAMPLE 5

Poly(HFP/VF2/MAN)

A. Polymer Preparation: The same set up was used as in Example 1 of U.S. Pat. No. 5,637,663. A mixture of 2000 g HFP, 160 g VF2, 5 g MAN dissolved in 10 ml trifluoroacetic acid, and about 1.1 g of $NF_3$ was made in 1 gallon reservoir (2). About 908 g of this mixture was run through the 10 ml shaken autoclave at 250° C./96.5 MPa over an 89 min period. After drying the product under vacuum at 150° C., 111 g of pale yellow polymer were obtained.

1 g/5 ml $CF_3CFHCFHCF_2CF_3$ at r. t., solution with haze
Inherent viscosity=0.182 in $CF_3CFHCFHCF_2CF_3$ at 25° C.
Melt index 150° C., 5 kg=3.1 g/min, clear, pale yellow, elastic
Tg=5° C. (second heat) by DSC @ 10° C./min under $N_2$
10% wt. loss by TGA at 410° C. @ 10° C./min under $N_2$ (starts at 150° C.)
Tm, none detected by DSC at 10° C./min under $N_2$
about 1.6 mole % maleic anhydride by $^{13}C$ NMR in hexafluorobenzene at 60° C., multiple absorptions @ about 160–170 ppm
47.4 mole % HFP by $^{13}C$ NMR
51.0 mole % VF2 by $^{13}C$ NMR
Productivity 7.5 kg/L/hr (62 lb./gal/hr)

B. Evidence for Improved Adhesion: The terpolymer prepared above was dissolved at 3 wt. % in acetone by stirring at room temperature.

Test bars approximately 2.5 cm×15 cm×0.31 cm were obtained of the following materials: stainless steel, aluminum, glass, Crastin® PBT (Dupont), Delrin® polyacetal (DuPont), Hytrel®, Rynite® PET (DuPont) and Zytel® nylon (DuPont). The test bars were cleaned by rinsing in acetone and then drying.

One sample of each test bar was dipped ⅔ of its length in the terpolymer solution. The bar was removed from the solution, was allowed to drain completely and was dried by hanging in an air circulating oven at 150° C. for 30 min. After drying, each bar was removed from the oven, allowed to cool to room temperature and was then dipped ⅓ of its length in a 3 wt % solution of 50:50 HFP:TFE copolymer in Fluorinert® FC-40 (3M Corp.). The bar was removed from the solution, was allowed to drain completely, and was dried by hanging in an air circulating oven at 150° C. for 30 min. Each bar was then removed from the oven and allowed to cool to room temperature. This resulted in each bar consisting of 3 sections of approximately equal length. One section of each bar was uncoated, one section was coated only with a thin coating of terpolymer, and one section with a first coat of terpolymer followed by a top coat of 50:50 HFP:TFE copolymer.

Both the terpolymer coating and the terpolymer first coat with 50:50 HFP:TFE copolymer top coat were strongly adhered to all test bars and could not be removed by scraping with a fingernail.

All test bars were then placed in boiling water for one hour. They were removed from the water, patted dry and were allowed to cool to room temperature. All bars were then subjected to ASTM D3359 Method B scratch test, in which a crossing grid is scratched into the coating, adhesive tape is applied and removed and the surface examined for flaking of the coating. No flaking was observed for any of the samples for either the terpolymer coating or the terpolymer first coat followed by 50:50 HFP:TFE copolymer top coat. An Eberhard Faber No. 101 eraser was rubbed against the coatings on all samples. Both the terpolymer coating and the terpolymer first coat with 50:50 HFP:TFE copolymer top coat remained intact for all samples except for the Rynite® and Delrin® samples, in which the coatings could be rubbed off.

When the 50:50 HFP:TFE copolymer coating is applied and dried in the above manner to each of the test bars without first applying a first coat, the coating is easily removed by scraping with a fingernail from all bars except the aluminum test bar which is strongly bonded.

EXAMPLE 6

Poly(TFE/PPVE/MAN)

A prechilled 400 ml pressure vessel was loaded with 5 g of MAN dissolved in 100 ml trifluoroacetic acid and 5 ml of about 0.1 M HFPOdP dissolved in $CF_3CF_2CFC_2OCFHCF_3$. The tube was cooled, evacuated, and then 5 g of PPVE and 50 g of TFE added. Heating for about 4 h at 40° C. gave a maximum pressure of 1.32 MPa that decreased to 1.23 MPa over the course of the run. The product was filtered, washed with acetone, and eventually dried at 75° C. in a vacuum oven. This gave 11.8 g of polymer that contained 0.39% hydrogen by combustion analysis. A 5:1 (molar) TFE/MAN polymer would contain about 0.34% H. A melt index experiment at 372° C. with a 15 kg weight barely extruded any polymer at all, giving dark brown extrudate at 0.01 g/min. Incomplete fusion was observed when attempts were made to press film at 300° C. between Kapton® polyimide sheets.

EXAMPLE 7

Poly(TFE/PPVE/MAN)

A prechilled 400 ml pressure vessel was loaded with 1 g of MAN dissolved in 100 ml trifluoroacetic acid and 5 ml of about 0.1 M HFPOdP dissolved in $CF_3CF_2CFC_2OCFHCF_3$. The tube was cooled, evacuated, and then 5 g of PPVE and 50 g of TFE added.

Heating for about 4 h at 40° C. gave a maximum pressure of 1.02 MPa on the way up at 21° C. that further decreased to 441 kPa at 40° C. over the course of the run. The product was filtered, washed with acetone, washed with $CFCl_2CCl_2F$, and eventually dried at 100° C. in a vacuum oven. This gave 49 g of polymer. Infrared analysis found 6.9 weight percent PPVE in the polymer and an estimated 0.35 wt % of maleic anhydride assuming that succinic anhydride can be used as a standard for the anhydride band. A melt index experiment at 372° C. with a 10 kg weight gave a dark brown, tough extrudate at 0.09 g/min. A film pressed between Kapton® sheets at 300° C. was yellow, reasonably tough, and quite adherent to the Kapton®.

EXAMPLE 8

Poly(TFE/PPVE/MAN)

A prechilled 400 ml pressure vessel was loaded with 1 g of maleic anhydride and 5 ml of about 0.14 M HFPOdP dissolved in $CF_3CF_2CFC_2OCFHCF_3$. The tube was cooled, evacuated, and then 5 g of PPVE, 50 g of TFE, and 175 g carbon dixoide added. The pressure vessel was shaken as it was allowed to warm from −47° C. and a pressure of 855 kPa to 30.8° C. and 6.96 MPa 260 min later. The autoclave was vented, an indefinite amount of the product coming out and being lost with the gases as a loose, fine powder. The white powder left in the vessel was washed with acetone, washed with $CFCl_2CCl_2F$, and eventually dried at 150° C. in a vacuum oven over a weekend giving 5.47 g of polymer. Infrared analysis found 2.9 weight percent PPVE in the polymer and an estimated 2.3 wt % of MAN assuming that succinic anhydride can be used as a standard for the anhydride band. A DSC run at 10° C./min under $N_2$ had its major melting endotherm at 266° C. on the second heat.

EXAMPLE 9

Poly(TFE/E/MAN)

A prechilled 400 ml pressure vessel was loaded with 2 g of MAN dissolved in 100 ml trifluoroacetic acid and 5 ml of about 0.1 M HFPOdP dissolved in $CF_3CF_2CFC_2OCFHCF_3$. The tube was cooled, evacuated, and then 14 g of ethylene and 50 g of TFE added. Heating for about 4 h at 40° C. gave a maximum pressure of 2.99 MPa at 41° C. that further decreased to 2.28 MPa at 40° C. over the course of the run. The product was filtered, washed with acetone, washed with $CFCl_2CCl_2F$, and eventually dried at 100° C. in a vacuum oven. This gave 20 g of polymer. Infrared analysis found an estimated 0.65 wt % of MAN assuming that succinic anhydride can be used as a standard for the anhydride band.

EXAMPLE 10

Poly(TFE/E/MAN)

A prechilled 400 ml pressure vessel was loaded with 1 g of MAN dissolved in 100 ml trifluoroacetic acid and 5 ml of about 0.2 M HFPOdP dissolved in $CF_3CF_2CFC_2OCFHCF_3$. The tube was cooled, evacuated, and then 14 g of ethylene and 50 g of TFE added. Heating for about 4 h at 40° C. gave a maximum pressure of 2.65 MPa at 46° C. that further decreased to 2.43 MPa at 40° C. over the course of the run. The product was filtered, washed with acetone, washed with $CF_2ClCCl_2F$, and dried at 150° C. in a vacuum oven. This gave 16 g of polymer. Infrared analysis found an estimated 1.5 wt % of MAN assuming that succinic anhydride can be used as a standard for the anhydride band.

EXAMPLE 11

Poly(TFE/E/MAN)

A prechilled 400 ml pressure vessel was loaded with 0.5 g of MAN dissolved in 100 ml trifluoroacetic acid and 5 ml of 0.14 M HFPOdP dissolved in $CF_3CF_2CFC_2OCFHCF_3$. The tube was cooled, evacuated, and then 14 g of ethylene and 50 g of TFE added. Heating for about 4 h at 40° C. gave a maximum pressure of 2.32 MPa at 30° C. that further decreased to 1.43 MPa at 40° C. over the course of the run. The product was filtered, washed with acetone, washed with $CFCl_2CCl_2F$, and eventually dried for 2 to 3 days at 150° C. in a vacuum oven. This gave 20.9 g of polymer. Infrared analysis found an estimated 0.3 wt % of MAN assuming that succinic anhydride can be used as a standard for the anhydride band.

EXAMPLE 12

Poly(TFE/E/MAN)

A prechilled 400 ml pressure vessel was loaded with 0.25 g of MAN dissolved in 100 ml trifluoroacetic acid and 5 ml of 0.14 M HFPOdP dissolved in $CF_3CF_2CFC_2OCFHCF_3$. The tube was cooled, evacuated, and then 14 g of ethylene and 50 g of TFE added. Heating for about 4 h at 40° C. gave a maximum pressure of 2.46 MPa at 29° C. that further decreased to 1.85 MPa at 40° C. over the course of the run. The product was filtered, washed with acetone, washed with $CFCl_2CCl_2F$, and eventually dried for 2 to 3 days at 150° C. in a vacuum oven. This gave 24.1 g of polymer. Infrared analysis found an estimated 0.3 wt % of MAN assuming that succinic anhydride can be used as a standard for the anhydride band.

EXAMPLE 13

Poly(TFE/PPVE/MAC)

A prechilled 400 ml pressure vessel was loaded with 1 g of MAC dissolved in 100 ml trifluoroacetic acid and 5 ml of about 0.16 M HFPOdP dissolved in $CF_3CF_2CFC_2OCFHCF_3$. The tube was cooled, evacuated, and then 5 g of PPVE and 50 g of TFE added. Heating for about 4 h at 40° C. gave a maximum pressure of 1.06 MPa at 29° C. that further decreased to 62 kPa at 40° C. over the course of the run. The product was filtered, washed with acetone, washed with $CFCl_2CCl_2F$, and eventually dried under vacuum giving 49 g of white polymer. Infrared analysis found a broad band with peaks at 1790, 1765, and 1747 $cm^{-1}$ that was difficult to quantify. A melt index experiment at 372° C. with a 15 kg weight gave a dark brown plug without extrusion.

EXAMPLE 14

Poly(TFE/PMVE/MAN)

A prechilled 400 ml pressure vessel was loaded with 1 g of MAN dissolved in 100 ml trifluoroacetic acid and 5 ml of about 0.16 M HFPOdP dissolved in $CF_3CF_2CFC_2OCFHCF_3$. The tube was cooled, evacuated, and then 75 g of PMVE and 50 g of TFE added. Heating for about 4 h at 40° C. gave a maximum pressure of 1.12 MPa at 34° C. that further decreased to 931 kPa at 40° C. over the course of the run. The product was filtered, washed in a Waring® blender 2× with 200 ml of methanol, 1× with 200 ml of acetone, 2× with 200 ml of $CFCl_2CCl_2F$, and then dried under vacuum giving 31 g of white polymer. A melt index experiment at 250° C. with a 5 kg weight gave a tough, foamed, colorless extrudate at 1.3 g/min. Infrared analysis found an estimated 0.3 wt % of MAN assuming that succinic anhydride can be used as a standard for the anhydride band.

EXAMPLE 15

Poly(TFE/PDD/MA)

A prechilled 400 ml pressure vessel was loaded with 0.25 g MAN dissolved in 50 ml trifluoroacetic acid, 5 ml of 0.13 M HFPOdP dissolved in $CF_3CF_2C_2OCFHCF_3$, and 25 ml (43 g) of PDD. The tube was cooled, evacuated, and then about 8 g of TFE was added. Heating for about 8 h at 40° C. gave a maximum pressure of 159 kPa at 7° C. that decreased to 7 kPa and then rose again to 124 kPa at 40° C. over the course of the run. The damp polymeric mass was washed in a Waring® blender 3× with 200 ml acetone and 3× with 200 ml of $CF_2ClCCl_2F$, and then dried overnight in a 150° C. vacuum oven giving 35 g of off-white polymer. An 0.2 g sample of this polymer gave a viscous solution after rolling overnight with 2 ml of FC-40. IR analysis was unable to give a MAN content, the anhydride band at 1897 $cm^{-1}$ being atypically sharp and near an interfering unknown band at 1919 $cm^{-1}$ and the 1822 $cm^{-1}$ band being very strong and off-scale.

A sample of this polymer was dissolved in hexafluorobenzene containing a trace of tetramethylsilane (TMS). $^{13}C$ NMR of this solution at 60° C. was then used to determine polymer composition. Maleic acid content was found to be 0.8 mole percent based on the singlet carbonyl absorption at 162.5 ppm versus internal TMS, PDD content to be 54.7 mole percent based on the most downfield peak at 125.8 ppm of the 1:3:3:1 $CF_3$ quartet, and TFE content to be 44.5 mole percent after integrating from 104 to 126 ppm and correcting for overlap by PDD.

EXAMPLE 16

In a cooled 400 mL pressure vessel, 0.1 g of Percadox(-16 initiator, bis(4-t-butylcyclohexyl) peroxydicarbonate, and 10.0 g of maleic anhydride were added. The vessel was evacuated and cooled to about −40° C. Forty g of TFE and 275 g of $CO_2$ were added to the vessel. While agitating, the vessel was heated to 55° C. and held for 5 h. Recovered material was heated in a vacuum oven which resulted in significant loss of weight accompanied by a change of color to brown. The material was found to be soluble in acetone. $^{19}F$ NMR revealed the presence of TFE runs and sequences of —$CF_2$— adjacent to hydrocarbon groups. FTIR indicated the presence of an anhydride structure.

EXAMPLE 17

To a chilled 400 mL pressure vessel, 2.5 g of a 6.9 wt % mixture of HFPOdP dissolved in $C_3F_7OCFCF_3CF_2OCFHCF_3$ and 0.1 g of maleic anhydride were added. The vessel was evacuated and cooled to about −40° C. and 273 g of $CO_2$, 40 g of TFE and 12 g of ethylene were added. While agitating, ambient air was blown on the vessel. As the vessel contents approached 25° C., an exothermic reaction resulted in a rapid rise in temperature to a peak temperature and pressure of approximately 48° C. and 20 MPa, respectively. As indicated by temperature and pressure, the bulk of the reaction was complete in 4 h. After a total of 16 h, the vessel was vented and 32.9 g of white material were recovered. The polymer had a melting point of 280° C. as measured by DSC on second heating with heating and cooling rates of 10° C./min. On pressing a 0.10 mm thick film sample at 300° C., it was observed that the copolymer could not be removed from aluminum plates and even adhered tenaciously to Kapton® polyimide film. Analysis of maleic anhydride content by IR, measured 0.1 wt % expressed as succinic anhydride. TFE content as determined by IR was 77 wt %.

EXAMPLE 18

To a chilled 400 mL pressure vessel, 2.5 g of a 6.9 wt % mixture of HFPOdP dissolved in $C_3F_7OCFCF_3CF_2OCFHCF_3$ and 0.1 g of maleic anhydride were added. The vessel was evacuated and cooled to about −40° C. and 265 g of $CO_2$, 50 g of TFE and 10 g of PEVE, were added. While agitating, ambient air was blown on the vessel. As the vessel contents approached 18° C., an exothermic reaction resulted in a rapid rise in temperature to a peak temperature and pressure of approximately 65° C. and 19 MPa, respectively. As indicated by temperature and pressure, the bulk of the reaction was complete in 1 h. After a total of 16 h, the vessel was vented and 43.7 g of white material were recovered. The polymer had a melting point of 307° C. as measured by DSC on second heating with heating and cooling rates of 10° C./min. On pressing a 0.10 mm thick sample at 335° C., it was observed that the copolymer adhered significantly to Kapton® polyimide film. Analysis of maleic anhydride content by IR, measured 0.13 wt % expressed as succinic anhydride. Composition as determined by IR measured 3.0 wt % PEVE in the polymer.

EXAMPLE 19

To a chilled 400 mL pressure vessel, 2.5 g of a 6.9 wt % mixture of HFPOdP dissolved in $C_3F_7OCFCF_3CF_2OCFHCF_3$ and 1.0 g of maleic anhydride were added. The vessel was evacuated and cooled to about −40° C. and 262 g of $CO_2$, 50 g of TFE and 12 g of PEVE, were added. While agitating, ambient air was blown on the vessel. As the vessel contents approached 20° C., an exothermic reaction resulted in a moderate rise in temperature to a peak temperature and pressure of approximately 27° C. and 9.1 MPa, respectively. As indicated by temperature and pressure, the bulk of the reaction was complete in 1 h. After a total of 19 h, the vessel was vented and 37.5 g of white material were recovered. The polymer had a peak melting point of 273° C. as measured by DSC on second heating with heating and cooling rates of 10° C./min. On pressing a 0.10 mm thick film sample at 335° C., it was observed that the copolymer adhered tenaciously to Kapton® polyimide film and was significantly discolored. Analysis of maleic anhydride content by IR measured 1.7 wt % expressed as succinic anhydride. Composition as determined by IR measured 3.1 wt % PEVE in the polymer.

EXAMPLE 20

A 1-liter vertical stirred reactor was charged with 2.0 g of dichloromaleic anhydride and was closed. The reactor was purged with $CO_2$ by several times charging with $CO_2$ and venting. The reactor was heated to 40° C., and the agitator was started at 800 rpm. The reactor was then charged to a pressure of 1300 psig (9.1 MPa) with a TFE/$CO_2$/ethane mixture of 189 g of TFE, 480 g of $CO_2$ and 1.92 g of ethane, and 32 mL of perfluoro(ethyl vinyl ether) were injected. Then, 15 mL of a 0.68 wt % solution of [$CF_3CF_2CF_2OCF$ $(CF_3)COO]_2$ initiator in $CF_3CF_2CF_2OCF(CF_3)$ $CF_2OCFHCF_3$ was injected. When this amount of initiator solution had been injected, the rate of addition of the same solution was reduced to 0.16 mL/min and this initiator feed was continued to the end of the polymerization. A feed of a TFE/CO$_2$ mixture was also started at the rate of 116 g/hr of TFE and 77 g/hr of CO$_2$ and was continued for 1.5 hr. After 1.5 hr, all feeds and the agitator were stopped, the reactor was vented and opened, and 139 g of polymer was recovered as a white powder after devolatilizing for 1 hr at 100° C. in a vacuum oven. The TFE copolymer contained 2.3 wt % of PEVE and 0.10 wt % of dichloromaleic anhydride as determined by Fourier transform infrared spectroscopy. MV based on MFR (melt flow rate) measurement (done according to ASTM D-3307) using a 2160 g load is $3.00 \times 10^3$ Pa.s and $T_m$ is 307° C.

EXAMPLE 21

Vinyl Fluoride with Maleic Anhydride

A 400 ml autoclave was loaded with 0.5 g maleic anhydride, chilled to <−20° C., loaded with 5 ml of ~0.16 M HFPOdP in Freon® E1, sealed, evacuated, and filled with 150 g CO$_2$ and 75 g vinyl fluoride. Agitating 24 h at rt gave a low density white solid that weighed 35 g after drying overnight under vacuum. Assuming that succinic anhydride can be used as a standard for the anhydride band, IR analysis estimated ~0.3 wt % maleic anhydride in the polymer.

EXAMPLE 22

TFE/CTFE with Maleic Anhydride

A 400 ml autoclave was loaded with 0.5 g maleic anhydride, chilled to <−20° C., loaded with 5 ml of ~0.16 M HFPOdP in Freon® E1, sealed, evacuated, and filled with 150 g CO$_2$, 50 g of chlorotrifluoroethylene, and 25 g of TFE. Agitating overnight at rt gave a white solid that weighed 6 g after drying overnight at 150° C. under vacuum. Elemental Analysis: Found: 2.93% C, 0.09% H, 17.50% Cl, 55.78% F Calc. (CTFE)54(TFE)42(MAN)4: 22.96% C, 0.07% H, 17.59% Cl, 57.61% F.

EXAMPLE 23

HFP/VF2 with Maleic Anhydride

A 400 ml autoclave was loaded with 0.5 g maleic anhydride, chilled to <−20° C., loaded with 5 ml of ~0.16 M HFPOdP in Freon® E1, sealed, evacuated, and filled with 75 g of vinylidene fluoride and 50 g of HFP. Agitating overnight at rt gave a white solid that weighed 72 g after drying overnight under vacuum. Assuming that succinic anhydride can be used as a standard for the anhydride band, IR analysis estimated ~0.7 wt % maleic anhydride in the polymer. No flow was observed at 372° C. in a melt index apparatus with a 5 kg weight suggesting either very high molecular weight or thermal crosslinking. A DSC melting point of 109° C. was observed on the second heat at 10° C./min under N$_2$.

EXAMPLE 24

VF2 with Maleic Anhydride

A 400 ml autoclave was loaded with 0.5 g maleic anhydride, chilled to <−20° C., loaded with 5 ml of ~0.16 M HFPOdP in Freon® E1, sealed, evacuated, and filled with 75 g of vinylidene fluoride and 150 g of CO$_2$. Agitating overnight at rt gave a white solid that weighed 44 g after drying overnight under vacuum. A DSC melting point of 175° C. was observed on the second heat at 10° C./min under N$_2$.

EXAMPLE 25

TFE/VF2 with Maleic Anhydride

A 400 ml autoclave was loaded with 0.5 g maleic anhydride, chilled to <−20° C., loaded with 5 ml of ~0.16 M HFPOdP in Freon® E1, sealed, evacuated, and filled with 32 g of vinylidene fluoride, 50 g of TFE, and 150 g CO$_2$. Agitating overnight at room temperature gave 67 g of white solid after drying overnight under vacuum. Assuming that succinic anhydride can be used as a standard for the anhydride band, IR analysis estimated ~0.07 wt % maleic anhydride in the polymer. No flow was observed at 372° C. in a melt index apparatus with a 5 kg weight suggesting either very high molecular weight or thermal crosslinking. A DSC melting point of 192° C. was observed on the second heat at 10° C./min under N$_2$.

EXAMPLE 26

TFE/VF2 with Maleic Anhydride

A 400 ml autoclave was loaded with 1 g maleic anhydride, chilled to <−20° C., loaded with 5 ml of ~0.16 M HFPOdP in Freon® E1, sealed, evacuated, and filled with 64 g of vinylidene fluoride, 50 g of TFE, and 150 g CO$_2$. Agitating overnight at rt gave a white solid that weighed 90 g after drying overnight under vacuum. Assuming that succinic anhydride can be used as standard for the anhydride band, IR analysis estimated ~0.3 wt % maleic anhydride in the polymer. No flow was observed at 372° C. in a melt index apparatus with a 5 kg weight suggesting either very high molecular weight or thermal crosslinking much as in Example 1 above. A DSC melting point was observed on the second heat at 10° C./min under N$_2$.

EXAMPLE 27

CTFE/Ethylene with Maleic Anhydride

A 400 ml autoclave was loaded with 0.5 g maleic anhydride, chilled to <−20° C., loaded with 5 ml of ~0.16 M HFPOdP in Freon® E1, sealed, evacuated, and filled with 59 g of chlorotrifluoroethylene, 14 g of ethylene, and 135 g CO$_2$. Agitating overnight at rt gave a white solid that weighed 50 g after drying overnight under vacuum. Assuming that succinic anhydride can be used as a standard for the anhydride band, IR analysis estimated ~0.2 wt % maleic anhydride in the polymer. Flow in a melt index apparatus at 235° C. with a 5 kg weight was 1.5 g/min. A DSC melting point at 223° C. was observed on the second heat at 10° C./min under N$_2$. Elemental Analysis: Found: 34.28% C, 2.98% H, 23.69% Cl, 39.35% F Calc. (CTFE)50(E)55(MA)1: 34.43% C, 3.00% H, 23.75% Cl, 38.18% F.

EXAMPLE 28

HFP/VF2 with Maleic Anhydride

A 400 ml autoclave was loaded with 1 g maleic anhydride, chilled to <−20° C., loaded with 5 ml of ~0.16 M HFPOdP in Freon® E1, sealed, evacuated, and filled with 64 g of vinylidene fluoride and 200 g of HFP. Agitating overnight at 50° C. gave a white solid that weighed 7.9 g after drying for 3 to 4 days under vacuum. $^{13}$C NMR analysis of an acetone solution found 11 mole % maleic anhydride, 17 mole % hexafluoropropylene, and 72 mole % vinylidene fluoride. Flow in a melt index apparatus at 150° C. with a 5 kg weight flow was 4.6 g/min. A weak DSC melting point was observed at 231° C. on the second heat at 10° C./min under $N_2$.

What is claimed is:

1. A process for the production of maleic anhydride, maleic acid, dichloromaleic anhydride or dichloromaleic acid copolymers with fluoroolefins by free radical polymerization in an essentially nonaqueous polymerization system, wherein the improvement comprises, using as a solvent one or more of: a compound of the formula $R^6CO_2H$ wherein $R^6$ is perfluoroalkyl containing 1 to 6 carbon atoms, liquid or supercritical carbon dioxide, or liquid or supercritical hexafluoropropylene.

2. The process as recited in claim 1 wherein said solvent is $R^6CO_2H$.

3. The process as recited in claim 2 wherein $R^6$ is trifluoromethyl.

4. The process as recited in claim 1 wherein said solvent is liquid or supercritical carbon dioxide.

5. The process as recited in claim 1 wherein said solvent is liquid or supercritical hexafluoropropylene.

6. The process as recited in claim 5 carried out at a temperature above 100° C.

7. A coated substrate in which the coating is selected from the group consisting of:

(a) a polymer, comprising, repeat units derived from:
      (i) at least 1 mole percent hexafluoropropylene;
      (ii) at least 1 mole percent total of one or more of tetrafluoroethylene, vinyl fluoride, trifluoroethylene, chlorotrifluoroethylene, ethylene, and vinylidene fluoride; and
      (iii) 0.03 to about 5 mole percent total of one or more of maleic anhydride, maleic acid, dichloromaleic anhydride or dichloromaleic acid; and
   (b) a polymer, comprising, repeat units derived from:
      (i) at least 1 mole percent tetrafluoroethylene;
      (ii) at least one mole percent of ethylene, a compound of the formula $F_2C=CFOR^1$ wherein $R^1$ is alkyl or halogen substituted alkyl containing 1 to 10 carbon atoms and optionally containing one or more ether oxygen atoms between perfluoroalkylene or perfluoroalkyl segments, perfluoro(2-metylene-4-methyl-1, 3-dioxolane), $F_2C=CF(CF_2)_pOCF=CF_2$ wherein p is 1 or 2, or a compound of the formula

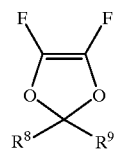

(I)

wherein $R^8$ and $R^9$ are each independently fluorine or perfluoroalkyl containing 1 to 4 carbon atoms; and
      (iii) 0.03 to about 10 mole percent of one or more of maleic anhydride, maleic acid, dichloromaleic anhydride or dichloromaleic acid.

8. A composite structure comprising the coated substrate of claim 7 plus an additional substrate adhered to the coating on the first mentioned substrate.

9. A melt blend of thermoplastic polymer and a polymer selected from the group consisting of:

(a) a polymer, comprising, repeat units derived from:
      (i) at least 1 mole percent hexafluoropropylene;
      (ii) at least 1 mole percent total of one or more of tetrafluoroethylene, vinyl fluoride, trifluoroethylene, chlorotrifluoroethylene, ethylene, and vinylidene fluoride; and
      (iii) 0.03 to about 5 mole percent total of one or more of maleic anhydride, maleic acid, dichloromaleic anhydride or dichloromaleic acid; and
   (b) a polymer, comprising, repeat units derived from:
      (i) at least 1 mole percent tetrafluoroethylene or chlorotrifluoroethylene;
      (ii) at least one mole percent of ethylene, a compound of the formula $F_2C=CFOR^1$ wherein $R^1$ is alkyl or halogen substituted alkyl containing 1 to 10 carbon atoms and optionally containing one or more ether oxygen atoms between perfluoroalkylene or perfluoroalkyl segments, perfluoro(2-metylene-4-methyl-1, 3-dioxolane), $F_2C=CF(CF_2)_pOCF=CF_2$ wherein p is 1 or 2, or a compound of the formula

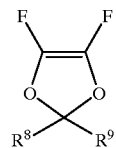

(I)

wherein $R^8$ and $R^9$ are each independently fluorine or perfluoroalkyl containing 1 to 4 carbon atoms; and
      (iii) 0.03 to about 10 mole percent of one or more of maleic anhydride, maleic acid, dichloromaleic anhydride or dichloromaleic acid.

* * * * *